June 9, 1953     M. L. AUDOYNAUD     2,641,528
MANUFACTURE OF CHLORINE DIOXIDE OF LOW CHLORINE CONTENT
Filed July 27, 1949
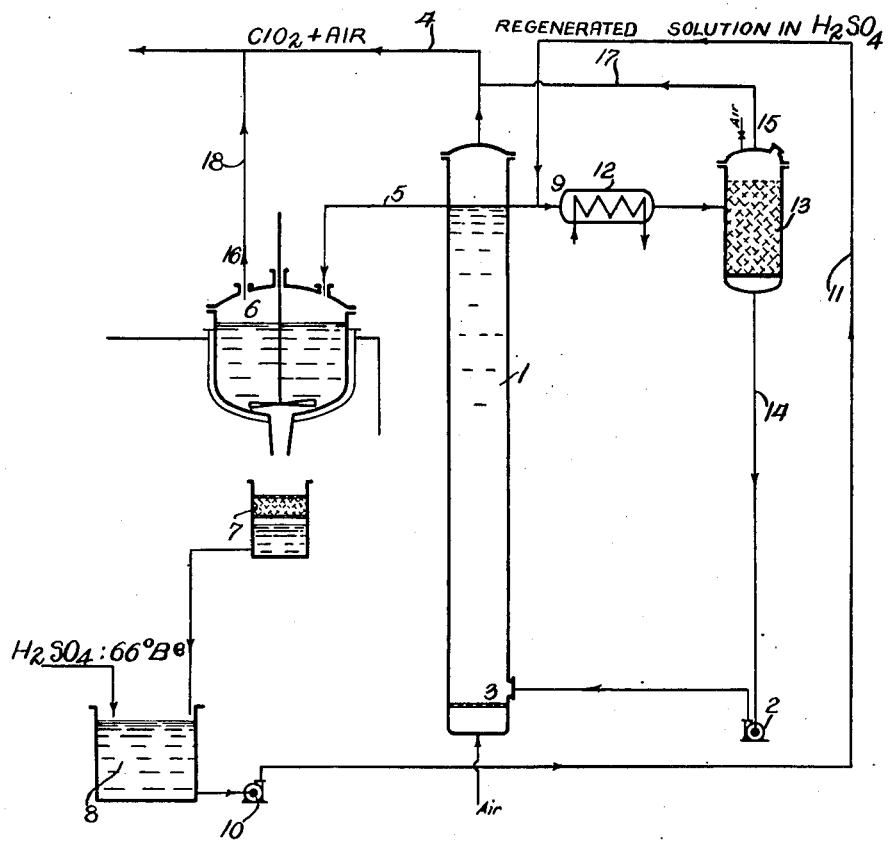
Max Louis Audoynaud
INVENTOR.

Patented June 9, 1953

2,641,528

UNITED STATES PATENT OFFICE 2,641,528

MANUFACTURE OF CHLORINE DIOXIDE OF LOW CHLORINE CONTENT

Max Louis Audoynaud, Oullin, France, assignor to Mathieson Chemical Corporation, New York, N. Y., a corporation of Virginia Application July 27, 1949, Serial No. 107,032
In France August 7, 1948

3 Claims. (Cl. 23—152)

This invention relates to the production from chlorates of chlorine dioxide which is relatively free from contaminating chlorine.

In various processes utilizing chlorine dioxide it is frequently necessary that the chlorine dioxide be as free from chlorine as possible. In general, the volumetric ratio of $Cl_2:ClO_2+Cl_2$ should not be above 5%. For example, the manufacture of chlorites particularly requires a gaseous mixture very rich in chlorine dioxide. The amount of chlorine admixed with the chlorine dioxide should be kept low because it gives rise to chlorides, which together with the usual impurities, particularly water which must be left in the chlorite to insure safety in handling, lower the chlorite concentration below the commercially acceptable value of 85%.

When chlorine dioxide is produced by reacting hydrochloric acid with an alkaline or alkaline earth metal chlorate, or magnesium chlorate, or chloric acid, the theoretical proportion of chlorine dioxide produced cannot exceed 66% of the gaseous mixture.

$$2HClO_3 + 2HCl \rightarrow 2H_2O + Cl_2 + 2ClO_2$$

The reaction, moreover, is accompanied by a secondary reaction, generating only chlorine, which further reduces the percentage of chlorine dioxide as follows:

$$2HClO_3 + 10HCl \rightarrow 6H_2O + 6Cl_2$$

In practice a ratio of $ClO_2:Cl_2+ClO_2$ greater than 62% cannot be obtained without selective purification, as by passage of the gaseous mixture over lime to remove the chlorine, or by passage, under controlled conditions over sulfur, in the presence of water. Obviously such purification procedures involve equipment complications and undesirable expense. It is theoretically possible to utilize all of the chlorate in the production of a gas rich in chlorine dioxide as by the use of reducing agents, such as oxalic acid, sulfur dioxide, ammonium compounds, alcohols and aldehydes, or by the use of hydrogen peroxide or persulfuric acid and its salts in an acid medium. These methods, however, are costly and often result in the contamination of the chlorine dioxide with other foreign elements, e. g. sulfur dioxide, carbon dioxide, etc., which are harmful in utilization of the chlorine dioxide.

It has also been proposed to produce chlorine dioxide by the action of a concentrated mineral acid, for example, sulfuric acid or phosphoric acid and the like, on a metallic chlorate free of chloride according to the following equation:

$$6NaClO_3 + 3H_2SO_4 \rightarrow 3Na_2SO_4 + 2HClO_4 + 2H_2O + 4ClO_2$$

Although this reaction does not make it possible to convert more than two-thirds of the available chlorine in the chlorate into chlorine dioxide, it does not require the use of reducing agents, and if it is suitably conducted it does not require selective purification of the gaseous mixture. However, the method has not proved attractive commercially because of the risks and dangers which it entails and because of the difficulty of avoiding the presence of chlorine with the chlorine dioxide, due to the secondary reaction:

$$8HClO_3 \rightarrow 4HClO_4 + 3O_2 + 2H_2O + 2Cl_2$$

According to the present invention, however, a gaseous mixture rich in chlorine dioxide and low in chlorine can be produced by causing a current of air or inert gas in finely divided form to pass into a solution of metallic chlorate in a concentrated mineral acid other than hydrochloric acid so as to bring about the release of the chlorine dioxide and effect its removal from the reaction medium. The reaction goes slowly at room temperature so that it is preferable to warm the solution. A temperature between 55° and 60° C. is advantageously maintained. The process is carried out in the absence of any reducing agent, and the gaseous mixture obtained can be used directly for the manufacture of chlorites without submitting it to preliminary purification.

The process of the invention can be carried out in an apparatus of the utmost simplicity and with great convenience and safety of operation since one of the essential elements of the reaction, namely the air or inert gas, is introduced into the apparatus uniformly and continuously, and discontinuing the air or gas flow rapidly slows down the chlorine dioxide liberation. Accordingly, the reaction is substantially self-regulating. The dangers of explosion are minimized by avoiding the use of thick pastes of acid or chlorate. It is advisable instead to work with acid solutions having a chlorate concentration which is not too high, equivalent, for example, to a concentration of 6 grams per liter of sodium chlorate in a solution of sulfuric acid of 1200 grams per liter, although this acid content should not be considered as an upper limit. Such concentration corresponds to the practical solubility of the salt in the acid solution being considered.

The solution thus employed is normally stable and does not release chlorine dioxide noticeably. If an inert gas in very divided form is blown into it, for example, by means of a porous member, chlorine dioxide is quickly released and the rate of release increases with the fineness of division of the air or inert gas. The reaction proceeds uniformly as long as the solution contains chlorate, but the speed of release decreases when the concentration of the chlorate falls to the very low value of 1 gram per liter. Moreover, the state of very fine division of the air or inert gas reduces the effect of the secondary reaction referred to above which regenerates chlorine. The value of the ratio $Cl_2:Cl_2+ClO_2$ of the gaseous mixture is thus lowered considerably, for example, from 15% to at least 5%.

Although it is not essential, it is preferable to use a solution of sodium chlorate the concentration of which is near the saturation concentration in the acid solution used in order to obtain uniformity of release and maximum reaction speed. The speed of the reaction is also favored by an increase in temperature. Thus the reaction is slow at about 25° to 30° C. but becomes more rapid at 60° C., without attendant risk or danger of explosion.

One of the important advantages of this invention is that it is remarkably well adapted to a continuous manufacturing cycle. Thus the process is advantageously carried out in a series of successive containers through which the solution circulates. Preferably, the reaction is conducted in towers which may contain packing materials or may be equipped with bubble or perforated plates. The circulation of the liquid and the gas is either countercurrent or concurrent, and in the latter case, the injection gas is advantageously used as a drive for the circulation of the liquid. For example, the solution is circulated from bottom to top in a packed column, and the air is admitted at the lower part so as to assure circulation of the liquid which flows from the top. Alternatively, the acid solution of chlorate may be sprayed into the upper portion of a tower; e. g., a bubble tower or tower packed with Raschig rings, and the air or inert gas may be introduced independently at the bottom of the tower. The acid solution of chlorate may also be atomized into the upper part of an empty tower at the bottom of which a current of air or inert gas is introduced. Of course the above methods of operation can be combined or other means assuring intimate contact between the air or the inert gas and the solution may be employed.

The reaction in accordance with this invention may be safely conducted due to the fact indicated above that stopping the flow of air or inert gas causes an immediate slowing of the chlorine dioxide generation. This self-regulation avoids all danger of accident due to faulty operation of the apparatus controlling the gas flow. To further increase safety, means for cooling the solution may be provided either on the reaction column or in the circulating path of the solution.

The acid solution is saturated with chlorate, in the generator or outside the generator by passage of the partially exhausted solution after previous reheating over a mass of solid chlorate crystals. The crystals are simply placed in a container, or a saturating apparatus provided with stirring means and in which an excess of crystals is constantly maintained can be used. This saturator is then kept at the desired temperature, for example, by use of a heating coil or by means of a double jacket for hot water or steam circulation.

In order to avoid the accumulation of metallic ions in the solution, it is advantageous to remove a portion thereof and precipitate the crystallizable salts by cooling. After separation of these salts the solution is readjusted to the desired concentration of acid by adding a suitable amount and is re-introduced into the cycle ahead of the saturator, at the same rate as that at which the withdrawal took place.

The following example illustrates one manner in which the process of the invention can be carried out.

71.73 grams of sodium chlorate were placed in the lower part of a column containing 1500 cc. of a sulfuric acid solution having a concentration of 1230 grams per liter. Air was then blown into the column through a porous stone at the rate of 30 liters per hour. After 6½ hours at a temperature of 60° C., 69.23 grams of sodium chlorate had been converted and had produced 30.23 grams of chlorine dioxide and 1.09 grams of chlorine. The percentage of chlorine dioxide in the gaseous mixture was 96.7% and the percentage of chlorate converted was 68.9%.

The invention will be further described with reference to the accompanying drawing which diagrammatically illustrates one suitable apparatus for carrying out the invention.

Referring to the drawing, a column 1 is shown of 1750 liters capacity and 1500 liters effective capacity, into which, 1650 liters of a solution of sulfuric acid of 1250 grams per liter containing 6.5 grams per liter of industrial sodium chlorate is circulated per hour from bottom to top by means of pump 2. At the same time finely divided air, at the rate of 18 cubic meters per hour is blown into the column at its lower part through porous plate 3. The gaseous mixture produced is evacuated from the upper part of column 1 through pipe 4. A fraction of the liquid, running out of the upper portion of the column through pipe 5, is collected in a closed crystallizer 6 provided with a stirrer and a cooling envelope in which brine is circulated. The solid mixture of crystals of acid sulfate and sodium perchlorate is separated from its mother liquor by a filter 7. The mother liquor is collected in vat 8 and readjusted to the titer of 1250 grams per liter of $H_2SO_4$ by the addition of 66° Baumé sulfuric acid. The regenerated solution is then introduced at 9 into the main cycle by means of pump 10 and line 11. The circulating solution is then passed into reheater 12, using steam or hot water, then into saturator 13 from which it is delivered by pipe 14 and pump 2 to the bottom of column 1.

Additional air entrances are provided in upper surfaces 15 and 16 of saturator 13 and crystallizer 6, and the gases released, mixed with air, are driven through pipes 17 and 18 to general collector 4.

In the course of one continuous cycle of manufacture having a duration of 57 hours 15 minutes, 531.3 kilograms of 100% sodium chlorate were dissolved in the acid solution. The gas released was caught in a second column sprayed with a solution of caustic soda to which hydrogen peroxide was added regularly. 304 kilograms of 100% sodium chlorite and 16.8 kilograms of sodium chloride, corresponding to 226.7 kilograms of chlorine dioxide and 10.2 kilograms of chlorine, respectively, were collected. The gaseous yield represented an average gaseous composition of 96% chlorine dioxide and 4% chlorine. The percentage of chlorate which disappeared from the solution and was converted to chlorine dioxide was 67.5%. In the course of the run, 953 kilograms of 100% sulfuric acid were consumed in reconcentration of the solution, and 1246 kilograms of crystalline material containing 2.5 kilograms of undecomposed chlorate were eliminated and collected on filter 7.

I claim:

1. A process of producing chlorine dioxide which comprises passing a current of finely divided inert gas into a solution warmed to about 55° to 60° C. and consisting essentially of a metallic chlorate in a concentrated mineral acid selected from the group consisting of sulfuric and phosphoric acids, and recovering the resulting chlorine dioxide which has been released and removed from the solution by the action of the current of finely divided inert gas.

2. The process of claim 1 in which the concentration of the chlorate is near the saturation point.

3. A process for producing chlorine dioxide which comprises passing a current of finely divided air into a heated solution maintained approximately between 55° and 60° C. and consisting essentially of sodium chlorate in concentrated sulfuric acid, and recovering the resulting chlorine dioxide which has been released and removed from the solution by the action of the current of finely divided air.

MAX LOUIS AUDOYNAUD.

References Cited in the file of this patent

UNITED STATES PATENTS

| Number | Name | Date |
|---|---|---|
| 2,000,222 | Dietrich et al. | May 7, 1935 |
| 2,280,938 | Vincent | Apr. 28, 1942 |
| 2,317,443 | Cunningham | Apr. 17, 1943 |
| 2,332,181 | Soule | Oct. 19, 1943 |
| 2,481,240 | Rapson et al. | Sept. 6, 1949 |
| 2,510,034 | Haller | May 30, 1950 |

FOREIGN PATENTS

| Number | Country | Date |
|---|---|---|
| 575,173 | Great Britain | Feb. 6, 1946 |